United States Patent [19]

Bolger

[11] Patent Number: 4,670,772
[45] Date of Patent: * Jun. 2, 1987

[54] RASTER DISTORTION CORRECTION FOR PROGRESSIVE SCAN TELEVISION SYSTEM

[75] Inventor: Thomas V. Bolger, Merchantville, N.J.

[73] Assignee: RCA Corporation, Princeton, N.J.

[*] Notice: The portion of the term of this patent subsequent to Jul. 15, 2003 has been disclaimed.

[21] Appl. No.: 687,531

[22] Filed: Dec. 28, 1984

[51] Int. Cl.$^4$ .............................. H04N 11/20
[52] U.S. Cl. ........................ 358/11; 358/64; 358/242; 358/140
[58] Field of Search .................. 358/11, 71, 64, 242, 358/65, 140

[56] References Cited

U.S. PATENT DOCUMENTS

| | | | |
|---|---|---|---|
| 3,893,174 | 7/1975 | Sano et al. | 358/65 |
| 4,127,873 | 11/1978 | Katagi | 358/242 |
| 4,400,719 | 8/1983 | Powers | 358/11 |
| 4,550,336 | 10/1985 | Sepp | 358/11 |
| 4,558,347 | 12/1985 | Pritchard et al. | |
| 4,583,113 | 4/1986 | Pritchard | 358/11 |
| 4,600,945 | 7/1986 | Bolger | 358/242 |

FOREIGN PATENT DOCUMENTS 59-57590 4/1984 Japan .................. 358/65

OTHER PUBLICATIONS

Article from IEEE Transactions on Consumer Electronics, R. Deubert, "Digital System for Horizontal Geometry and Convergence Correction", vol. CE-30, No. 3, Aug. 1984.

Primary Examiner—James J. Groody
Assistant Examiner—Robert M. Bauer
Attorney, Agent, or Firm—Paul J. Rasmussen; Joseph Laks; Scott J. Stevens

[57] ABSTRACT

A progressive scan video display apparatus incorporates beam landing error correction circuitry. Beam landing error correction may be accomplished prior or subsequent to video information interpolation and prior or subsequent to video information speedup. The correction circuits utilize sample interpolation techniques to provide accurate beam landing error correction for each of the red, green and blue video information signals.

18 Claims, 9 Drawing Figures

RASTER DISTORTION CORRECTION FOR PROGRESSIVE SCAN TELEVISION SYSTEM

This invention relates to a progressive scan video display apparatus and, in particular, to a progressive scan apparatus having horizontal beam landing raster distortion correction.

A normal broadcast television signal supplies video information in line interlaced format; i.e., successive fields of video information comprise scanning lines that are vertically displaced from the scanning lines of the previous field. In the NTSC system, fields of 262½ lines are displayed at a 60 Hz field rate so that video information is displayed at each of the 525 line locations on the cathode ray tube display screen at a 30 Hz frame rate. This relatively slow frame rate may be discernible as an objectionable interline flicker to some observers. Also, if the field lines are not interlaced properly, the line structure of the display may become visible.

A video display apparatus utilizing a progressive scan display is not subject to the previously described problems associated with interlaced scan displays. A progressive scan arrangement in the NTSC system displays 525 lines each 1/60 of a second, as compared to 262½ lines in the interlaced format, thereby greatly reducing the appearance of line structure and interline flicker.

A progressive scan system displays twice as much video information as a normal interlace scan system since there are twice as many video lines displayed in a given time period. In a time progressive scan system, this additional video information is provided to the video display apparatus as a part of the incoming video signal. This additional information, however, increases the required signal bandwidth of the video signal beyond the bandwidth available in the NTSC system. In order to have a progressive scan display format that is compatible with standard NTSC broadcast signals, it is necessary to derive the additional video information needed from the limited video information that is provided.

The additional lines of video information may be derived by several techniques, including repeating previously displayed lines, or interpolating the video information pixels of adjacent lines to form an intermediate line of video information pixels having signal values averaged from adjacent line pixels. U.S. Pat. No. 4,583,113 issued Apr. 15, 1986 in the name of D.H. Pritchard and entitled PROGRESSIVE SCAN TELEVISION DISPLAY SYSTEM EMPLOYING INTERPOLATION IN THE LUMINANCE CHANNEL, for example, describes a progressive scan system in which luminance information for the additional lines of video information is interpolated from adjacent lines of video information while the chrominance information is derived from repeated video information lines.

The display of video information in either a progressive scan or line interlace format is subject to electron beam landing errors, such as raster distortion or beam misconvergence, which is due in part to electron gun physics and cathode ray tube geometries. Controlling the energization of the cathode ray tube electron beams by selectively or simultaneously delaying the red, green and blue video signals may be used to correct the previously described beam landing errors. It is important, however, to choose an appropriate signal delay technique that provides sufficiently accurate correction for high resolution cathode ray tubes. In a broadcast compatible progressive scan system, for example, it is also desirable to perform as many signal processing functions, including beam landing error correction, prior to increasing the video information signal rate for the progressive scan display.

In accordance with the present invention, a progressive scan video display apparatus comprises a circuit for sampling at least a first line of video information occurring at a first display rate to form a number of video information pixels. A circuit derives a second line of video information, having a number of video information pixels, from at least the first line of video information.

Beam landing error correction circuitry combine video information pixels from the first line of video information to form a first corrected line of video information, made up of pixels having an apparent displacement from the pixels of the first line of video information.

Beam landing error correction circuitry combines video information pixels from the second line of video information to form a second corrected line of video information made up of pixels having an apparent displacement from the pixels of the second line of video information.

A circuit successively displays the first and second corrected lines of video information at a second display rate.

In the accompanying drawing, FIG. 1 is a block and schematic diagram of one embodiment of a progressive scan video display system in accordance with the present invention;

Figure 1:
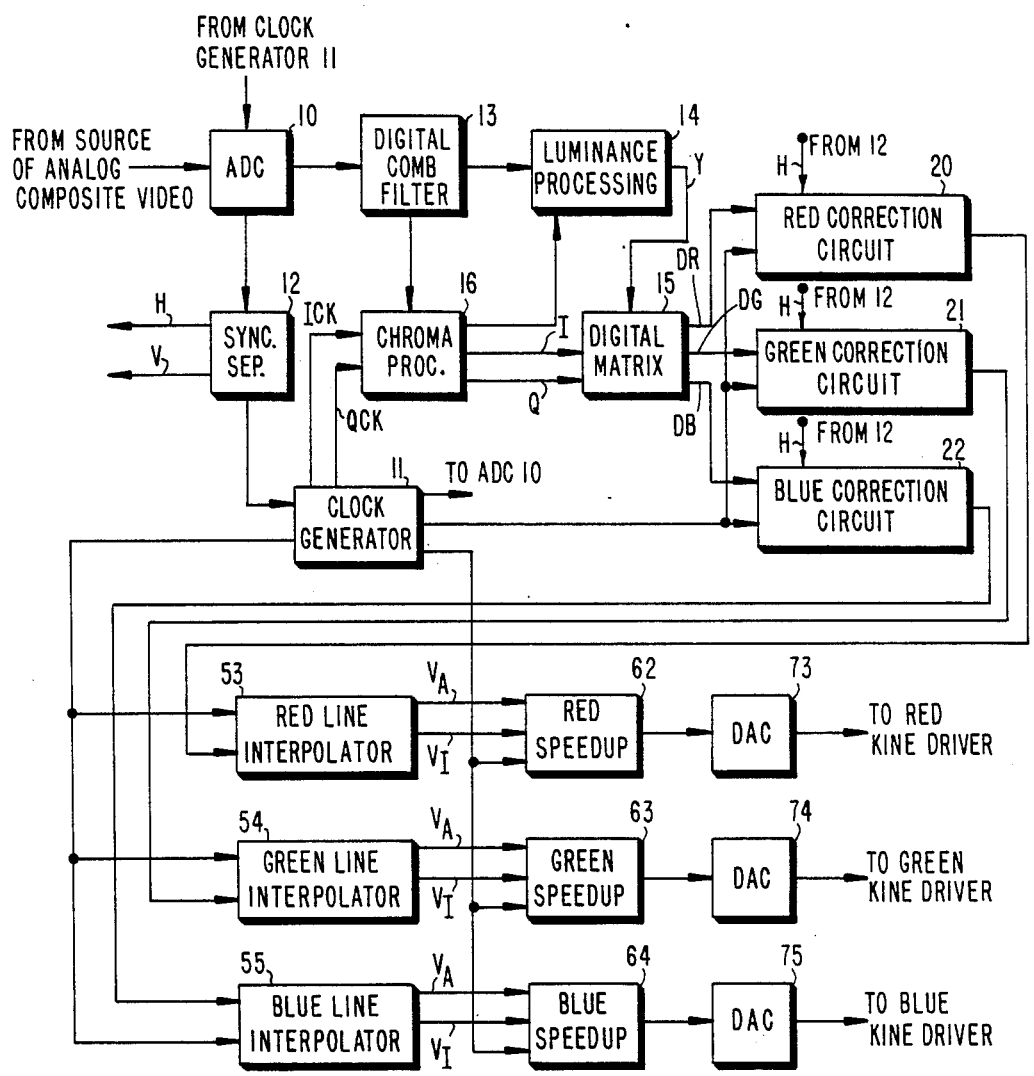

FIG. 1 illustrates one embodiment of a progressive scan video display system incorporating beam landing position error correction circuitry. Referring to FIG. 1, an analog composite video signal, from a source of video signals (not shown), is applied to an analog-to-digital converter (ADC) 10. ADC 10 generates digital samples or pixels at a sample rate determined by the clock signal frequency of a clock generator 11. Clock generator 11 of FIG. 1 illustratively produces a sampling frequency of 14.32 MHz, which is equal to four times the color subcarrier frequency for NTSC color signals. ADC 10 illustratively provides digital samples having 8 bits, thereby generating samples having $2^8=256$ possible quantizing steps. The digitized video signal is applied to a synchronizing separator circuit 12, where it is processed to remove the horizontal and vertical synchronizing information designated as H and V which may be applied to suitable horizontal and vertical deflection circuits (not shown), respectively. The video signal is also applied to a digital comb filter 13, which separates the luminance and chrominance information into separate channels.

The luminance information is applied to luminance processing circuitry 14 which provides a luminance signal on a conductor designated Y to a digital matrix 15. Chrominance information is applied to chrominance processing circuitry 16, which generates the I and Q color signals in response to the properly phased I and Q clock signals, provided on conductors designated ICK and QCK from clock generator 11. The I and Q color signals, on conductors I and Q, are applied to digital matrix 15, which combines the luminance signal Y and the I and Q color signals to produce the digital red, green and blue video pixels on conductors DR, DG and DB, respectively.

Figure 2:
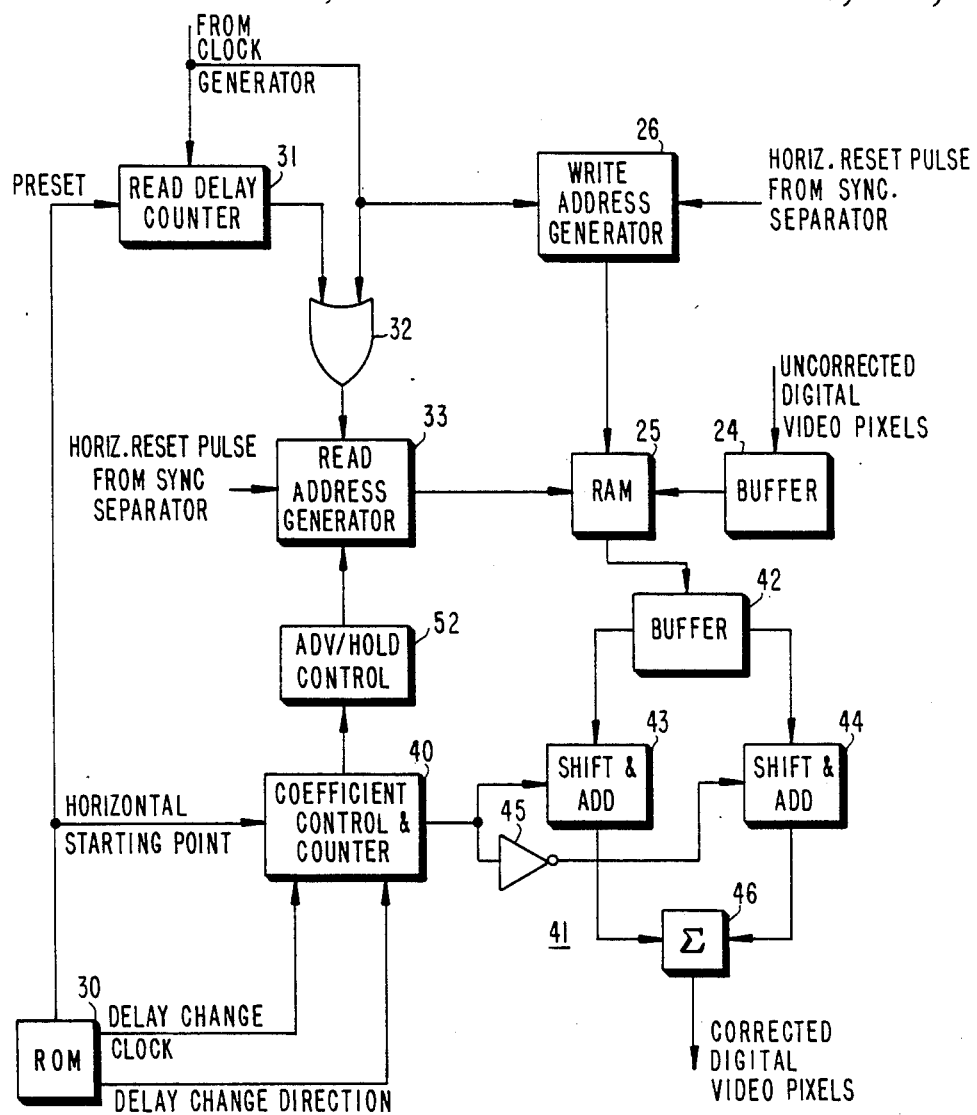
FIG. 2 is a block and schematic diagram of an embodiment of a horizontal scan beam landing error correction circuit in accordance with an aspect of the present invention.

The digital red, green and blue video pixels from digital matrix 15 are applied to electron beam landing position error correction circuits 20, 21 and 22, respectively. FIG. 2 illustrates, in detail, a circuit for correcting horizontal beam landing errors, such as is described in a copending U.S. patent application Ser. No. 645,984, filed Aug. 31, 1984, in the name of T. V. Bolger and entitled DIGITAL VIDEO DELAY BY SAMPLE INTERPOLATION, herein incorporated by reference. The circuit of FIG. 2 shows an illustrative embodiment of a correction circuit that may be utilized for each of the red, green and blue correction circuits 20, 21 and 22. Correction circuits 20, 21 and 22 may also incorporate circuitry for correcting vertical beam landing errors, such as is described in a copending U.S. patent application, Ser. No. 676,141, filed Nov. 29, 1984, and allowed on Mar. 4, 1986, in the name of T. V. Bolger and entitled DIGITAL VERTICAL BEAM LANDING CORRECTION CIRCUIT, herein incorporated by reference.

Referring now to FIG. 2, the uncorrected digital video pixels from digital matrix 15, comprising 8-bit digital samples, are illustratively applied to a buffer 24 which produces a 16-bit pixel pair comprising two adjacent 8-bit video pixels from a given horizontal line of video information. For example, subsequent pixel pairs may comprise pixels one and two, pixels two and three, and pixels three and four, such that each subsequent pixel pair comprises one new 8-bit pixel not included in the previous pixel pair. The 16-bit pixel pairs are stored in a random access memory (RAM) 25 in locations determined by a write address generator 26. Write address generator 26 is incremented by a write clock signal provided by clock generator 11. Write address generator 26 is reset each horizontal scan line by a horizontal reset pulse that is illustratively generated by synchronizing pulse separator 12.

Beam landing correction of the video signal is accomplished by introducing a delay between the writing and reading of video information into and out of RAM 25. In particular, this is accomplished by writing a predetermined number of pixel pairs into RAM 25 before the reading of pixel pairs out of RAM 25 is begun. Pixel pairs are written into RAM 25 at the write clock rate, e.g., 14.32 MHz, which corresponds to one pixel pair being written into RAM 25 approximately every 70 nanoseconds. The delay between writing and reading therefore corresponds to a delay of 70 nanoseconds for each pixel pair. RAM 25, configured to accommodate 128 pixel pairs can therefore produce a maximum delay of 128 pixel pairs ×70 nanoseconds/pixel pair =8.96 $\mu$S. In order to provide horizontal movement of the digital red, green and blue color video information in either direction with respect to each other on the kinescope display screen, a nominal delay is provided for each of the digital video information for each horizontal video line. The amount of actual delay desired for individual pixels in a given horizontal video line can then be provided by increasing or decreasing the amount of delay relative to the nominal delay. For the circuit of FIG. 2, a nominal delay of 4.48 $\mu$S, corresponding to 64 pixel pairs×70 nS/pixel pair gives the maximum amount of relative pixel movement in both horizontal directions that can be produced by RAM 25. For example, if the digital green video information is processed by green correction circuit 21 to have a nominal delay of 4.48 $\mu$S, the red video information processed by red correction circuit 20, may be delayed with respect to the green video information by a maximum of 4.48 $\mu$S, or the red video information may be advanced with respect to the green video information by a maximum of 4.48 $\mu$S. The amount of the delay is determined by the time at which video information pixels are read from RAM 25 relative to the time at which those pixels were written into RAM 25. A larger capacity RAM will of course provide a greater delay range.

The units of pixel delay that have been discussed up to this point have been determined by whole numbers of clock pulses, i.e., 70 nanosecond steps. In actual operation, however, the amount of beam landing error, such as convergence or raster distortion, requiring correction may not correspond to whole numbers of delay steps, but may require a fraction of a delay step in order to bring the convergence or distortion errors within desired tolerances or specifications.

The circuit illustrated in FIG. 2 therefore incorporates means that provides fractional amounts of whole delay steps in order to accurately correct convergence and raster distortion errors. The fractional delay steps are achieved via sample interpolation circuitry, which operates in the following manner.

The convergence errors and amounts of raster distortion (side pincushion distortion, for example) for a given video display apparatus are determined during assembly of the video display apparatus. One technique for determining this error utilizes photodiodes placed at various cathode ray tube display screen locations to sense actual electron beam landing positions. Knowing the beam landing positions needed to produce a raster without misconvergence or distortion errors allows a determination of the amount of shift needed in the actual beam landing positions in order to accomplish the desired corrections. This shift information is utilized to program a read-only-memory (ROM) 30 during assembly or alignment of the video display apparatus. The ROM 30, which may include misconvergence and distortion information for each digital pixel of each video information line, or for a predetermined number of pixels in selected lines, is individually programmed for a particular cathode ray tube of a particular video display apparatus.

For a given video information line, the amount of video information delay needed (nominal delay plus or minus delay increase or decrease) to effect the desired corrections is provided by ROM 30 to a read delay counter 31 via a conductor identified as PRESET. Read delay counter 31 is incremented by clock pulses from clock generator 11. The preset information from ROM 30 inhibits an output from read delay counter 31 until the read delay counter has been incremented to the preset value. Read delay counter then begins to produce output pulses in response to the clock pulses from the generator 11. The output pulses from read delay counter 31 are applied to the input of an AND gate 32. Another input of AND gate 32 is coupled to clock generator 11. AND gate 32 will therefore produce output pulses representative of clock pulses whenever the preset delay count has been exceeded. The AND gate 32 output pulses are applied to a read address generator 33, which is reset each horizontal line by a signal from the sync separator. Read address generator 33 is coupled to RAM 25 and accesses a particular pixel location of RAM 25 during each of the clock pulses from AND gate 32. Pixels are read out of RAM 25 from addresses accessed by read address generator 33 in the order they were written into RAM 25 from buffer 24, i.e., first in - first out. Read address generator 33 will always lag write address generator 26 so that information will always be present in RAM 25.

As previously described, merely delaying the reading out of video pixels from RAM 25 by an integer number of clock pulses may not provide accurate enough convergence or raster distortion correction. It may be necessary to provide a delay equal to a fraction of the delay resulting from an integer clock pulse delay. This fractional delay may be effected by sample interpolation, as is described in the aforementioned U.S. patent application Ser. No. 645,984, which combines a fraction of the digital amplitude values of pixels having adjacent positions in a video line to form a new pixel having a new amplitude value intermediate the amplitude values of the selected pixels. The new pixel will then appear to be displaced on the kinescope display screen with respect to the selected pixels. The fractions selected illustratively comprise a unity fractional complement; that is, the sum of the fractions selected for an adjacent pixel pair should sum to unity. It is possible to shift the video information in as small an increment as desired, merely by selecting the fractional coefficients. Increasing the number of fractional parts of a selected coefficient will result in smaller delay steps.

The initial whole and fractional delay steps for each video line is stored in ROM 30 to establish a horizontal starting point for the video signal information of each line. As described previously, the number of whole clock pulse delay intervals is applied to read delay counter 31 via the PRESET conductor, in order to determine when pixels will begin to be read from RAM 25. ROM 30 also provides information, representative of the fractional delay coefficient, to a coefficient control and counter circuit 40, which in turn applies the coefficient information to a pixel interpolator circuit 41. Interpolator circuit 41 incorporates a buffer 42, shift and add circuits 43 and 44, inverting circuitry 45 and a summation circuit 46. Buffer 42 reforms the 16-bit pixel pair from RAM 25 into two 8-bit pixels which are respectively applied to shift and add circuits 43 and 44. The coefficient information from coefficient control and counter circuit 40 is applied to shift and add circuit 43 and to inverting circuitry 45. The coefficient information digital word value determines the number of digital shifts required by shift and add circuit 43. Inverting circuitry 45 forms a digital word representative of the unity fractional complement coefficient, which is then applied to shift and add circuit 44. Shift and add circuits 43 and 44 perform the function of multiplying the amplitude values of pixels from buffer 42 by their respective fractional coefficients. This is accomplished in part by shifting the appropriate number of bits of the digital pixels based on the coefficient. The outputs from shift and add circuits 43 and 44 are combined by summation circuit 46 to form the resultant corrected video information pixels.

The rate of delay change (the number of digital pixels occurring between coefficient changes), and the delay change direction (whether the delay is increased or decreased) are also programmed into ROM 30 as a result of the error measurements taken during cathode ray tube alignment. Data indicative of the frequency and direction of the coefficient change is applied to coefficient control and counter circuit 40. This coefficient change data either increments or decrements the coefficient counter, which in turn controls the operation of interpolator 41. When the coefficient counter of coefficient control and counter circuit 40 becomes incremented or decremented to its upper or lower limit, respectively, an output signal is applied to advance/hold control circuit 52. When the coefficient counter becomes incremented to its upper limit, advance/hold control circuit 52 increments read address generator 33 by one pixel address. This is in addition to the normal address increments which occur in response to the clock pulses from AND gate 32. Similarly, when the coefficient counter becomes decremented to its lower limit, advance/hold control circuit 52 prevents read address generator from being incremented for a period of one clock pulse. This effectively resets the advance/hold control circuit 52.

Figure 3:
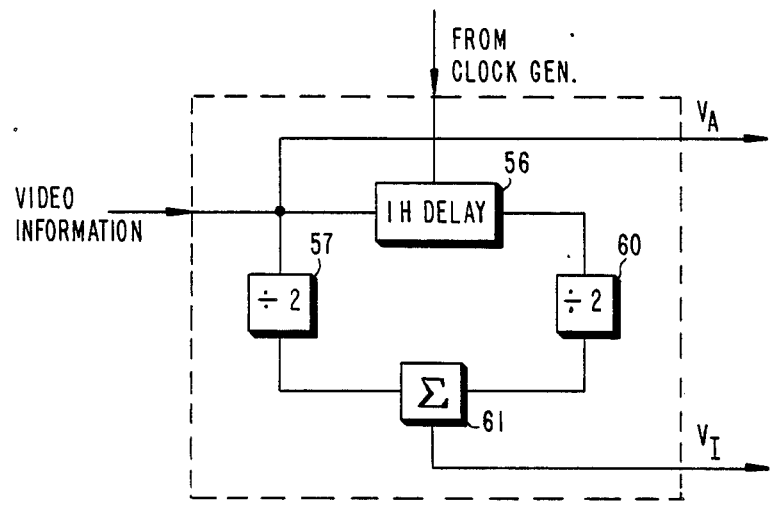
FIG. 3 is a block diagram of a representative video line interpolation circuit.

The beam landing position error corrected video information from the red correction circuit 20, the green correction circuit 21 and the blue correction circuit 22 is applied, respectively, to a red line interpolator circuit 53, a green line interpolator circuit 54, and a blue line interpolator circuit 55. Interpolator circuits 53, 54 and 55 generate the additional video lines that are needed each field in order to display a non-interlaced progressive scan raster. FIG. 3 illustrates a representative line interpolation circuit that may be used, for example, as the red, green and blue line interpolators 53, 54 and 55. Other interpolation techniques or circuits may of course be used.

The line interpolator of FIG. 3 incorporates a horizontal video line (lH) delay circuit 56 which may be, for example, in the form of a charge coupled device (CCD). With reference to the embodiment of FIG. 1, digital video information pixels are applied to the line interpolators from the correction circuits 20, 21 and 22. The pixels are applied to line delay circuit 56 and to an amplitude attenuator, illustratively shown as a divide by two circuit 57, which reduces the amplitude value of the pixels. Pixels are also passed through the interpolator undelayed to form the undelayed or actual pixel information, designated in FIG. 3 as $V_A$.

Pixels are transferred through delay circuit 56 serially in response to clock pulses at the write clock rate from the clock generator. The amount of pixel delay will then be determined by the number of storage locations in delay circuit 56. As previously described, delay circuit 56 comprises a lH delay. The output of delay circuit 56 is applied to a divide by two amplitude attenuator 60, which operates in the same manner as attenuator 57. The outputs of attenuators 57 and 60 are applied to a summation circuit 61, which produces video information pixels having amplitude values interpolated from the actual and the delayed lines of video information.

Attenuator circuits 57 and 60 are provided in order to normalize the output from summation circuit 61. The output of summation circuit 61 forms the interpolated or alternate pixel information, designated in FIG. 3 as $V_I$.

The actual $V_A$ and interpolated $V_I$ digital video pixel information from red, green and blue line interpolators 53, 54 and 55 is applied to red, green and blue speedup circuitry 62, 63 and 64, respectively. Speedup circuitry 62, 63 and 64 processes the $V_A$ and $V_I$ pixel information so that the video information originally occurring in two video information lines is displayed in the time normally required to display a single line. This results in twice as many video lines being displayed per field then in a normal NTSC interlaced scan display system. This permits a progressive scanning arrangement to be used, which of course requires horizontal deflection circuit which operates at 31.5 kHz, twice the normal NTSC horizontal rate of 15.75 kHz.

Figure 4:
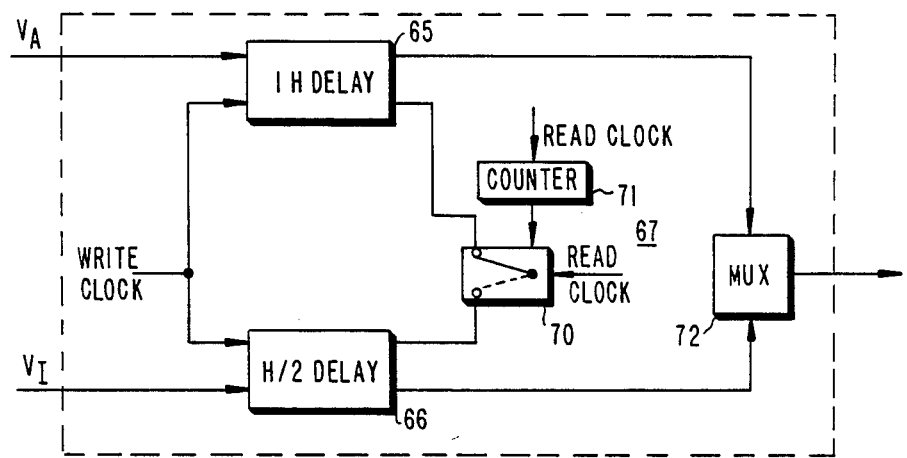
FIG. 4 is a block diagram of a representative video line speedup circuit.

FIG. 4 illustrates a representative circuit that may be used for each of the red, green and blue speedup circuits 62, 63 and 64. Other circuit configurations and techniques are possible. The speedup circuit of FIG. 4 operates by generating an output signal comprising video information pixels occurring at a rate of 28.64 MHz, so that two video lines may be displayed in the time normally required to display one video line having pixels occurring at a rate of 14.32 MHz. The actual or $V_A$ video information pixels are applied to a 1 H delay circuit 65. The interpolated or $V_I$ video information pixels are applied to a ½H delay circuit 66. The pixels are written into their respective delay devices in response to the write clock pulses, from the clock generator, occurring at a rate of 14.32 kHz. The $V_A$ and $V_I$ video information pixels are read out of their respective delay devices in response to read clock pulses, from the clock generator, occurring at a rate of 28.64 MHz. The $V_A$ and $V_I$ pixel information is written into delay circuits 65 and 66 simultaneously. Lines of video information pixels are read out of delay circuits 65 and 66 on an alternate basis in response to signals from switching circuit 67, which comprises a switch 70 and a counter 71. Counter 71 is responsive to the read clock pulses and illustratively applies a switching pulse to switch 70 after a count corresponding to the number of pixels per video line is reached.

Delay circuits 65 and 66 operate on a first in - first out basis. In order to produce video information for two progressive scan video lines, pixel information is first read out of delay circuit 66. Pixel information is read out of delay device 66 at twice the rate that pixel information is written into delay circuit 66. Delay circuit 66 will continue to receive pixel information at the 14.32 MHz rate as information is being read out at the 28.64 MHz rate. When a complete line of video information has been read out of delay circuit 66, delay circuit 66 will no longer contain any data while delay circuit 65 will contain a complete line of video information pixels. Switching circuit 67 will then cause video information pixels to be read from delay circuit 65. When a complete line of video information has been read from delay circuit 65, delay circuit 65 will be half filled with video information from the following video line, while delay circuit 66 will be filled with data. The previously described video information reading and writing cycle is then repeated. The pixel information from delay circuits 65 and 66 is applied to a multiplexing circuit 72, which produces a digital video signal having pixels occurring at a 28.64 MHz rate.

The output of multiplexer circuit 72 represents the output of the speedup circuit, which in FIG. 1 is applied from the red, green and blue speedup circuits 62, 63 and 64 to digital to analog converters 73, 74 and 75, respectively. The outputs of the digital to analog converters 73, 74 and 75 are then applied to the respective red, green and blue kinescope driver circuits (not shown).

Figure 5:
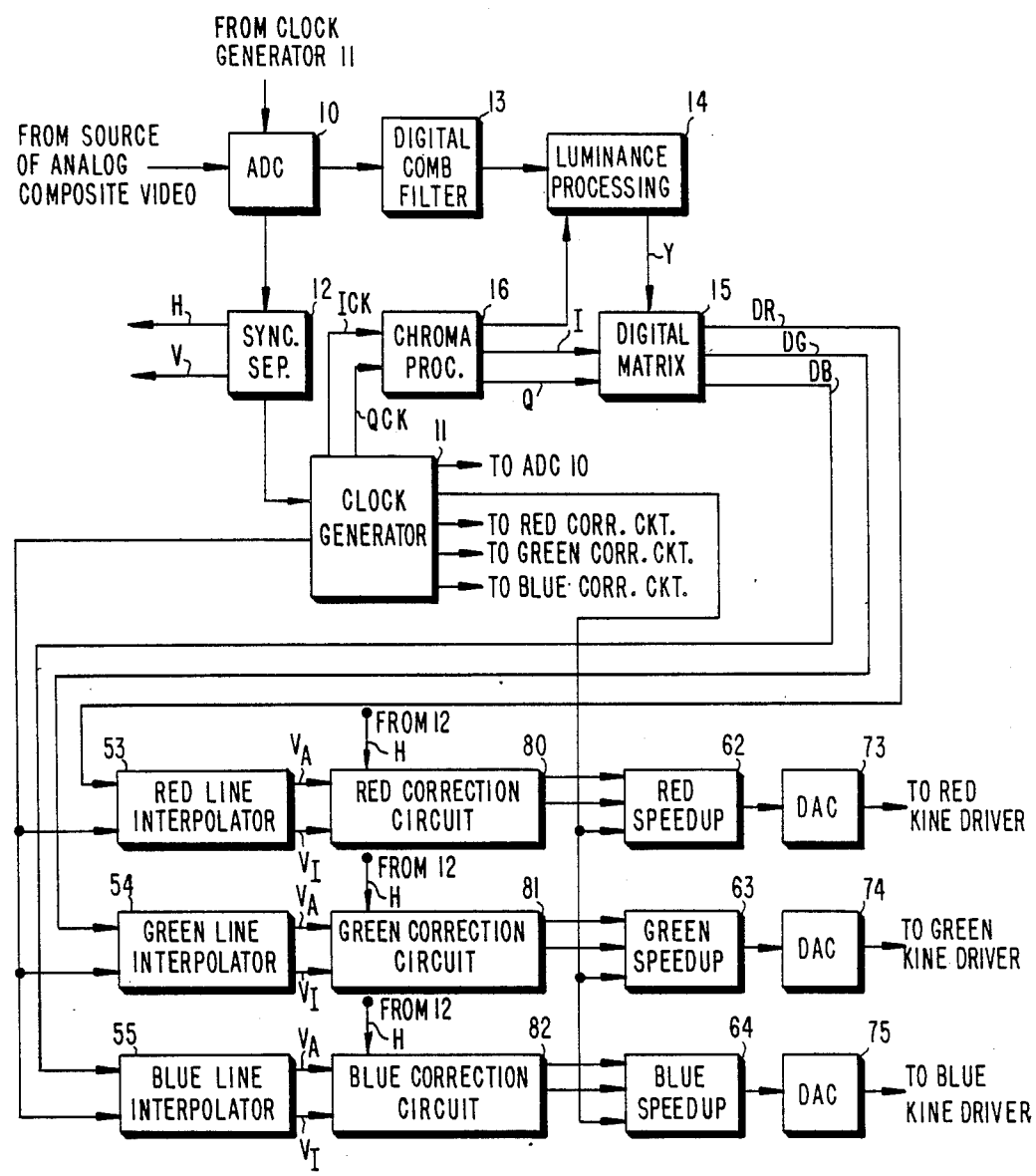
FIG. 5 is a block and schematic diagram of another embodiment of a progressive scan video display system in accordance with the present invention.

FIG. 5 illustrates another embodiment of a progressive scan video display system in which the beam landing error correction circuitry acts individually on both the actual and interpolated pixel information. Circuit elements illustrated in FIG. 5 which correspond to elements shown in FIG. 1 are designated with the same reference numerals.

Figure 6:
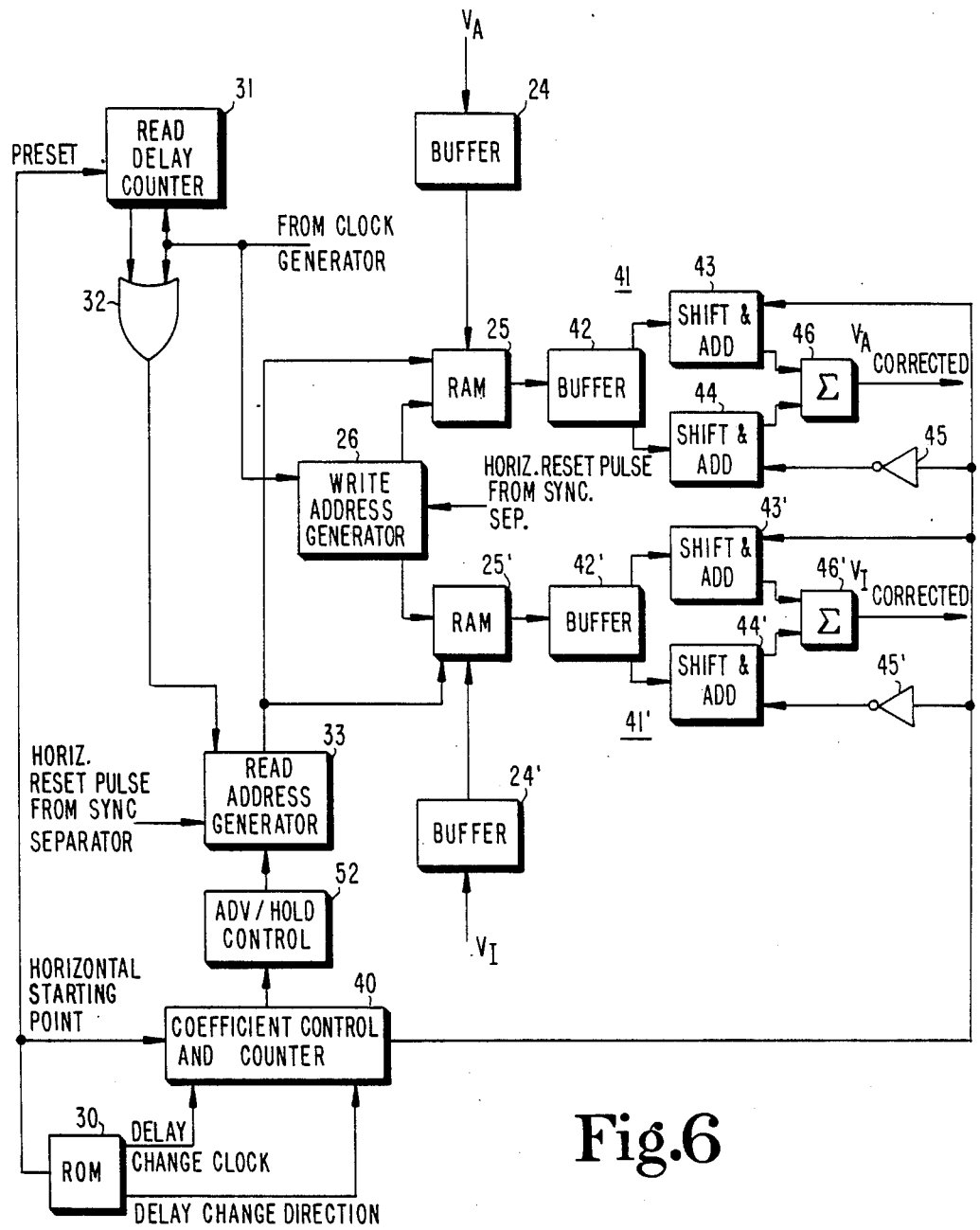
FIG. 6 is a block and schematic diagram of another embodiment of a horizontal beam landing error correction circuit.

In the circuit of FIG. 1, beam landing error correction was performed on the digital red, green and blue video signals prior to line interpolation. In the circuit of FIG. 5, beam landing error correction is performed by red, green and blue correction circuits 80, 81 and 82, respectively, subsequent to line interpolation. FIG. 6 illustrates a representative beam landing error correction circuit that performs simultaneous error correction on two lines of video information. The circuit of FIG. 6 operates in a manner similar to that described with respect to FIG. 2. Corresponding elements are therefore designated with the same reference numerals. Separate RAM memories 25 and 25' are provided for the actual and the interpolated video information pixels. The RAM memories are accessed simultaneous by the write address generator 26 and the read address generator 33. Data from coefficient control counter 40 is likewise applied to interpolator circuits 41 and 41' simultaneously. Video information pixels are therefore processed in the same manner by interpolator circuits 41 and 41'. The corrected actual video information from summation circuit 46 and the corrected interplated video information from summation circuit 46' form the output signals of the beam landing error correction circuit which, in the embodiment of FIG. 5 are then applied to red, green and blue speedup circuits 62, 63 and 64.

Figure 7:
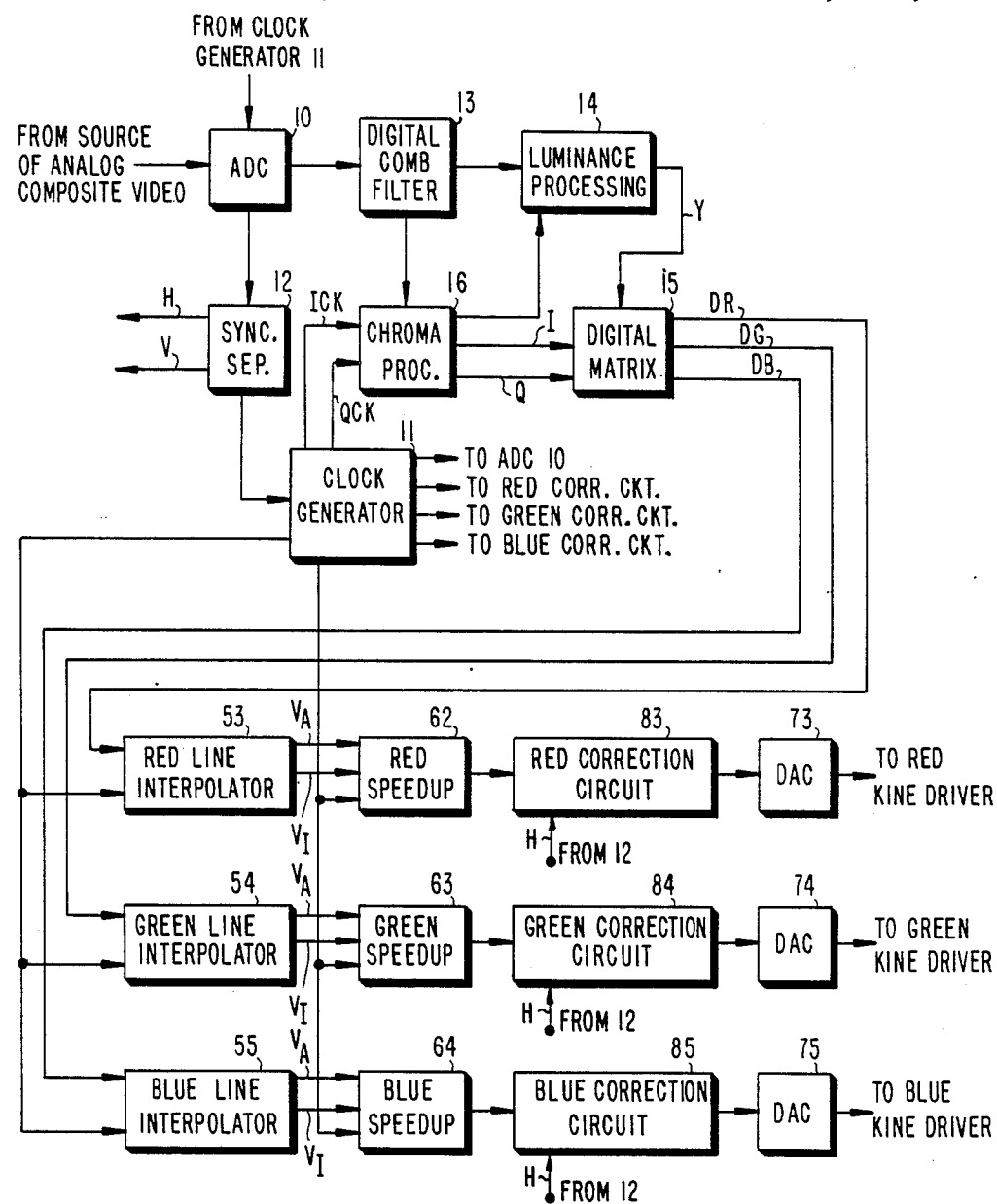
FIGS. 7, 8 and 9 illustrate block and schematic diagrams of other embodiments of progressive scan video display systems in accordance with the present invention.

FIG. 7 illustrates another embodiment of a progressive scan video display system in which the red, green and blue beam landing correction circuits 83, 84 and 85 are located subsequent to the red, green and blue speedup circuits 62, 63 and 64. The correction circuits 83, 84 and 85 each operate in a manner similar to that described with respect to the correction circuit of FIG. 2; however, since the beam landing error correction follows video information speedup, the video information must be processed by the correction circuits 83, 84 and 85 at a rate equal to twice the rate at which information is processed by the correction circuits 20, 21 and 22 of FIG. 1.

Figure 8:
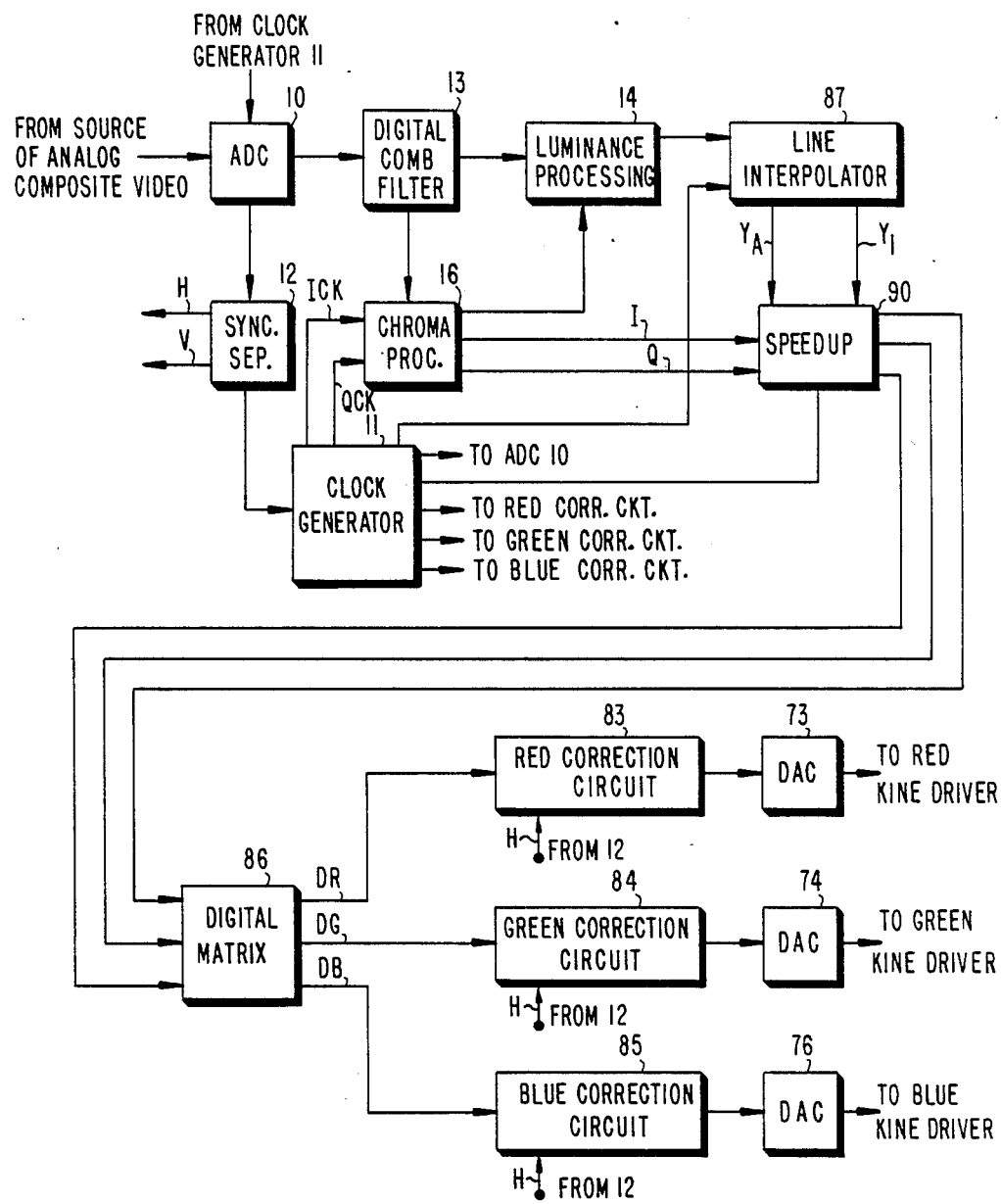

FIG. 8 illustrates an embodiment of a progressive scan video display system in which speedup occurs with respect to the Y, I and Q video components prior to being processed by a digital matrix 86 into the digital red, green and blue video information signals. In the circuit of FIG. 8, line interpolation is performed on the luminance channel only by a line interpolation circuit 87 to form an actual luminance signal $Y_A$ and an interpolated luminance signal $Y_I$. In the embodiment of FIG. 8, a speedup circuit 90 illustratively repeats the I and Q information for a given $Y_A$ and $Y_I$ luminance information line pair.

Figure 9:
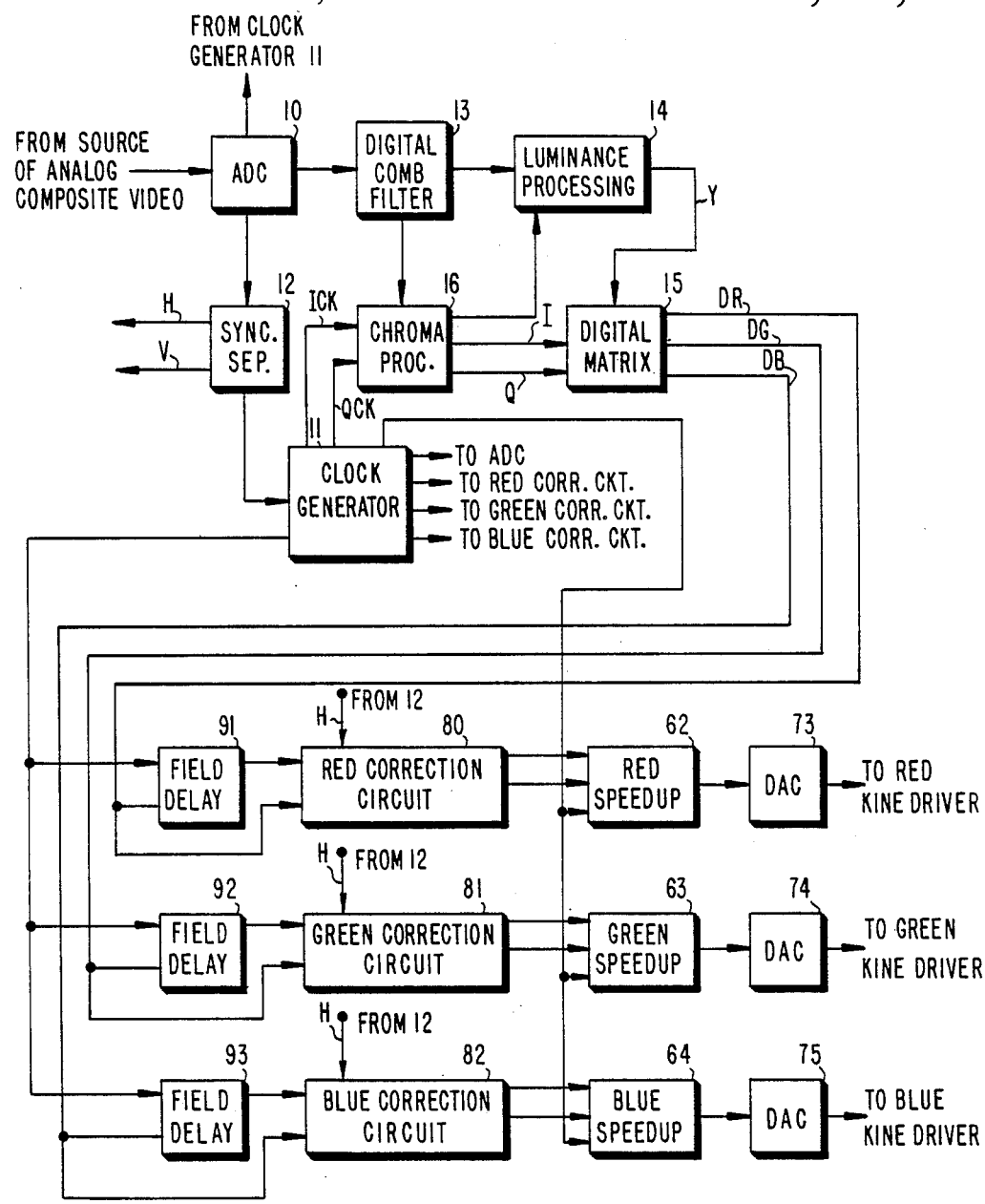

FIG. 9 shows a progressive scan video display apparatus utilizing red, green and blue field delay circuits 91, 92 and 93, respectively, rather than line interpolation circuits.

What is claimed is:

1. A progressive scan video display apparatus comprising:
    means for sampling at least a first line of video information occurring at a first display rate to form a plurality of video information pixels;
    means for deriving a second line of video information comprising a plurality of video information pixels from at least said first line of video information;
    means for combining video information pixels from said first line of video information to form a first corrected line of video information comprising video information pixels having an apparent displacement from said video information pixels of said first line of video information in order to effect movement of displayed video information;
    means for combining video information pixels from said second line of video information to form a second corrected line of video information comprising video information pixels having an apparent displacement from said video information pixels of said second line of video information in order to effect movement of displayed video information; and
    means for successively displaying said first and second corrected lines of video information at a second display rate.

2. The arrangement defined in claim 1, wherein said second display rate is equal to twice said first display rate.

3. The arrangement defined in claim 1, wherein said means for combining video information pixels from said first and said second lines of video information comprises means for providing first and second fractional sample coefficients and means for processing first and second video information pixels from said plurality of video information pixels in response to said first and second fractional sample coefficients, respectively, in order to form a video information pixel having an apparent displacement from said first and second video information pixels.

4. The arrangement defined in claim 3, wherein said first and second fractional sample coefficients form a unity fractional complement.

5. A progressive scan video display apparatus comprising:
    means for sampling at least a first line of video information occurring at a first display rate to form a plurality of video information pixels;
    means for combining video information pixels from said first line of video information to form a first corrected line of video information comprising video information pixels having an apparent displacement from said video information pixels of said first line of video information in order to effect movement of displayed video information;
    means for deriving a second corrected line of video information comprising a plurality of video information pixels from said first corrected line of video information; and
    means for successively displaying said first and second corrected lines of video information at a second display rate.

6. The arrangement defined in claim 5 wherein said second display rate is equal to twice said first display rate.

7. The arrangement defined in claim 5, wherein said means for combining video information pixels from said first line of video information comprises means for providing first and second fractional sample coefficients and means for processing first and second video information pixels from said plurality of video information pixels in response to said first and second fractional sample coefficients, respectively, in order to form a video information pixel having an apparent displacement from said first and second video information pixels.

8. The arrangement defined in claim 7, wherein said first and second fractional sample coefficients form a unity fractional complement.

9. A progressive scan video display apparatus comprising:
    means for sampling at least a first line of video information occurring at a first display rate to form a plurality of video information pixels;
    means for deriving a second line of video information comprising a plurality of video information pixels from at least said first line of video information;
    means for successively displaying said first and second lines of video information at a second display rate; and
    means for combining video information pixels from said line of video information at said second display rate to form a corrected line of video information at said second display rate comprising video information pixels having an apparent displacement from said video information pixels of said line of video information at said second display rate in order to correct electron beam landing errors.

10. The arrangement defined in claim 9, wherein said second display rate is equal to twice said first display rate.

11. The arrangement defined in claim 9, wherein said means for combining video information pixels from said line of video information at said second display rate comprises means for providing first and second fractional sample coefficients and means for processing first and second video information pixels from said plurality of video information pixels in response to said first and second fractional sample coefficients, respectively, in order to form a video information pixel having an apparent displacement from said first and second video information pixels.

12. The arrangement defined in claim 11, wherein said first and second fractional sample coefficients form a unity fractional complement.

13. A progressive scan video display apparatus comprising:
    means for digitally sampling a first line of video information to form a plurality of video information pixels;
    means for digitally sampling a second line of video information to form a plurality of video information pixels;
    means for combining respective video information pixels from said first and said second line of video information to form a first vertical beam landing error corrected line of video information comprising video information pixels having an apparent vertical offset position between said respective video information pixels;

means for deriving a second vertical beam landing error corrected line of video information comprising a plurality of video information pixels from said vertical beam landing error corrected line of video information;

means for combining video information pixels from said first vertical beam landing error corrected line of video information to form a first corrected line of video information comprising video information pixels having an apparent displacement from said video information pixels of said first vertical beam landing error corrected line of video information in order to correct vertical and horizontal electron beam landing errors;

means for combining video information pixels from said second vertical beam landing error corrected line of video information to form a second corrected line of video information comprising video information pixels having an apparent displacement from said video information pixels of said second vertical beam landing error corrected line of video information in order to correct vertical and horizontal electron beam landing errors; and means for successively displaying said first and second corrected lines of video information at a second display rate.

14. The arrangement defined in claim 13, wherein said second display rate is equal to twice said first display rate.

15. A progressive scan video display apparatus comprising:

means for digitally sampling a first line of video information to form a plurality of video information pixels;

means for digitally sampling a second line of video information to form a plurality of video information pixels;

means for combining respective video information pixels from said first and said second line of video information to form a vertical beam landing error corrected line of video information comprising video information pixels having an apparent vertical offset position between said respective video information pixels;

means for combining video information pixels from said vertical beam landing error corrected line of video information to form a first corrected line of video information comprising video information pixels having an apparent displacement from said video information pixels of said vertical beam landing error corrected line of video information in order to correct vertical and horizontal electron beam landing errors;

means for deriving a second corrected line of video information comprising a plurality of video information pixels from said first corrected line of video information; and means for successively displaying said first and second corrected lines of video information at a second display rate.

16. The arrangement defined in claim 15, wherein said second display rate is equal to twice said first display rate.

17. A progressive scan video display apparatus comprising:

means for digitally sampling a first line of video information to form a plurality of video information pixels;

means for digitally sampling a second line of video information to form a plurality of video information pixels;

means for combining respective video information pixels from said first and said second line of video information to form a first vertical beam landing error corrected line of video information comprising video information pixels having an apparent vertical offset position between said respective video information pixels;

means for deriving a second vertical beam landing error corrected line of video information comprising a plurality of video information pixels from said vertical beam landing error corrected line of video information;

means for successively displaying said first and second vertical beam landing error corrected lines of video information at a second display rate; and means for combining video information pixels from said vertical beam landing error line of video information at said second display rate to form a corrected line of video information at said second display rate comprising video information pixels having an apparent displacement from said video information pixels of said vertical beam landing error corrected line of video information of said second display rate in order to correct vertical and horizontal electron beam landing errors.

18. The arrangement defined in claim 17, wherein said second display rate is equal to twice said first display rate.

* * * * *